Oct. 20, 1959  T. S. BRISKIN ET AL  2,909,098
SLIDE PROJECTORS
Filed Nov. 4, 1955  5 Sheets-Sheet 2
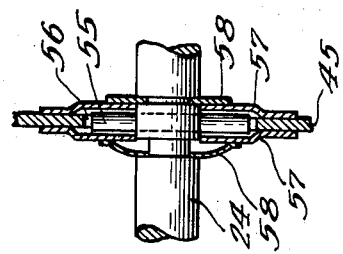
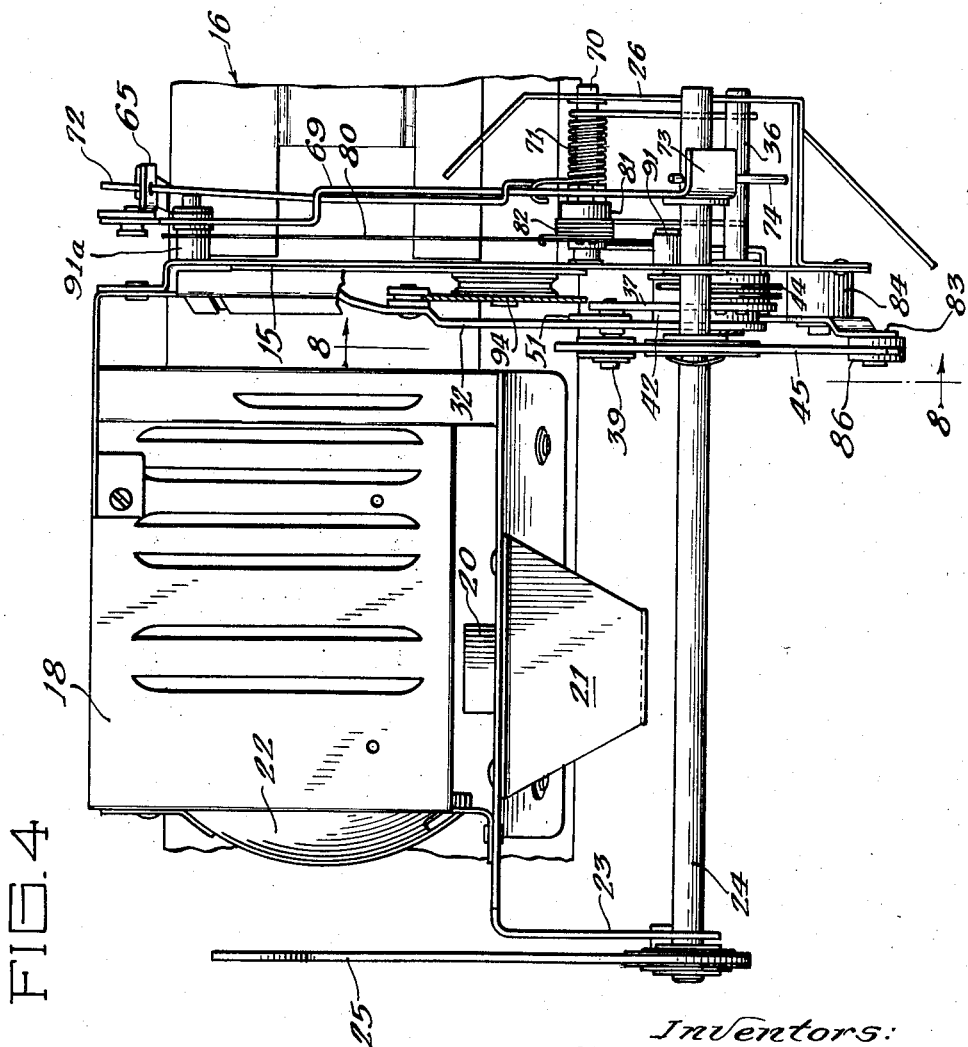

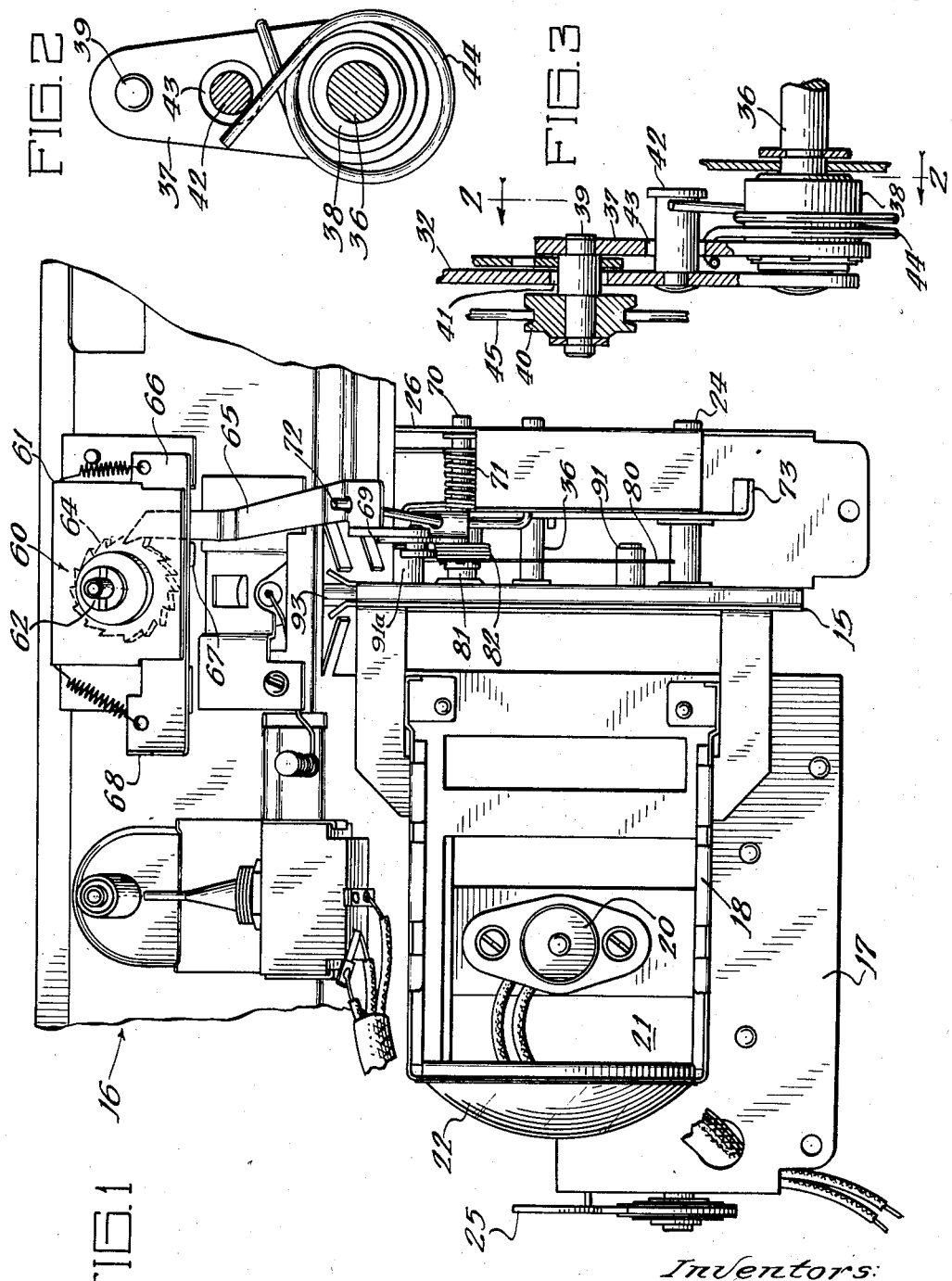

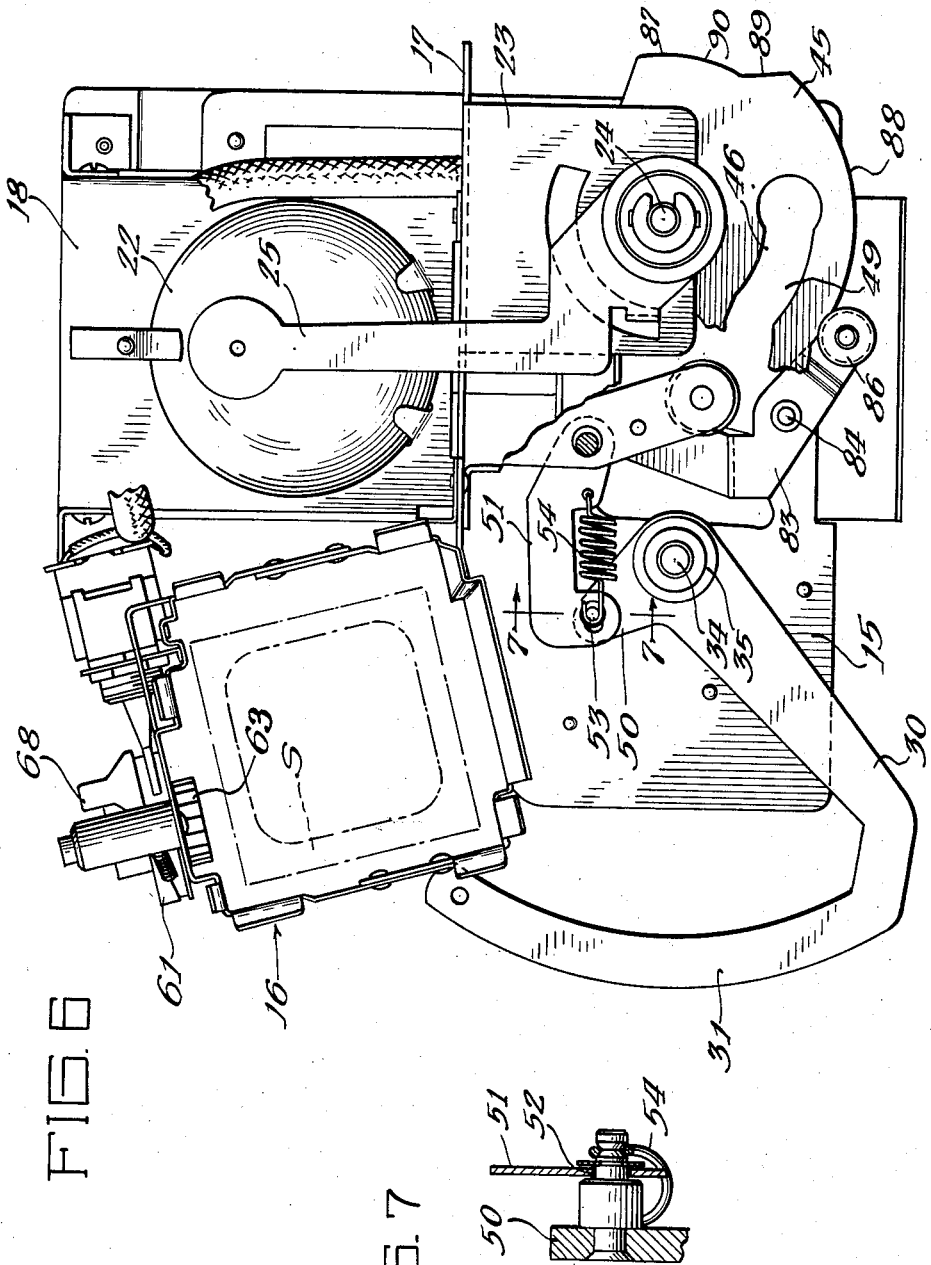

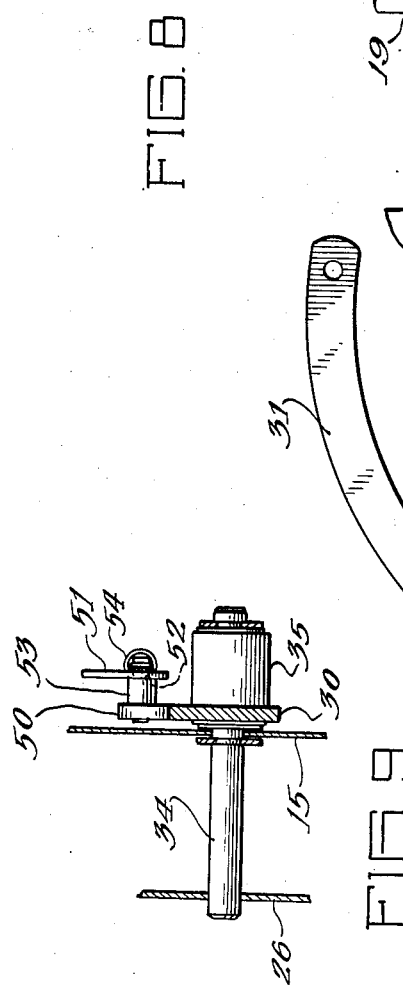

Oct. 20, 1959  T. S. BRISKIN ET AL  2,909,098
SLIDE PROJECTORS
Filed Nov. 4, 1955  5 Sheets-Sheet 5

Inventors:
Theodore S. Briskin
Robert L. Moore
Rudolph A. Rom
By: Zabel, Baker, York,
Jones & Dithmar
Attorneys

United States Patent Office 2,909,098
Patented Oct. 20, 1959

2,909,098

SLIDE PROJECTORS

Theodore S. Briskin, Chicago, Robert L. Moore, La Grange Highlands, and Rudolph A. Rom, Stickney, Ill., assignors to Revere Camera Company, Chicago, Ill., a corporation of Delaware Application November 4, 1955, Serial No. 545,068

4 Claims. (Cl. 88—28)

This invention relates to improvements in slide projectors and is a continuation-in-part of our application, Serial No. 495,474, filed March 21, 1955.

The aforesaid copending application relates to a slide projector in which the slides are arranged in a single magazine from which the slides may be successively displaced into projecting position and to which magazine each slide is returned after projection. Such a projector includes, in addition to the light source and optical system, magazine locating means spaced from the axis of said optical system, shutter means intersecting the optical axis, and operating mechanism. The operating mechanism, in turn, includes slide transporting mechanism, magazine advance mechanism, and shutter operating mechanism. The aforesaid copending application is further characterized by a novel type of slide transporting mechanism, in which the motion of the slide displacing elements is essentially rotational, thus permitting actuation of the same by a rock shaft.

The present invention relates to a projector of the same general type as that outlined above, but which is characterized by an improved type of operating mechanism.

It is an object of the present invention to provide a slide projector of the type indicated in which the magazine advance mechanism and the shutter operating mechanism are actuated by the same rock shaft that operates the slide transporting mechanism. In the aforesaid copending application, the rock shaft is driven from a unidirectionally rotating drive member, and the magazine advance mechanism and shutter operating mechanism are driven from cams mounted on said drive member.

The arrangement of the present invention provides a simpler and less costly construction.

A further object of this invention is to provide a slide projector incorporating certain of the advantageous features of the aforesaid copending application, and in particular, the improved slide transporting mechanism and magazine advance mechanism, but which is better adapted for manual operation.

A still further object is to provide an improved projector operating mechanism which is characterized by a single oscillating drive member, such as a rock shaft, from which all of the mechanism may be directly actuated in proper timed sequence. In this connection, it is understood that whereas the mechanism is well adapted for manual actuation by virtue of the provision of the single rock shaft, nevertheless, the present invention is not limited to manual actuation of the rock shaft or to a so-called manually operated projector, since the rock shaft is equally well adapted for actuation by suitable power means, such as a solenoid, or a motor and crank or motor and cam arrangement.

Other objects, features, and advantages will become apparent as the description proceeds.

With reference now to the drawings in which like reference numerals designate like parts:

Fig. 1 is a plan view of a projector mechanism assembly, the same comprising a preferred embodiment of this invention;

Fig. 2 is an enlarged detail, and vertical section, taken along line 2—2 of Fig. 3, and illustrating the overthrow spring of the ejector arm;

Fig. 3 is a section taken along line 3—3 of Fig. 8;

Fig. 4 is a right side elevation of the mechanism shown in Fig. 1;

Fig. 5 is an enlarged detailed view showing the manner in which the cam is secured to the power shaft;

Fig. 6 is a rear elevation of the mechanism assembly shown in Fig. 1;

Fig. 7 is a detailed view taken along line 7—7 of Fig. 6;

Fig. 8 is a section taken along line 8—8 of Fig. 4 showing certain of the parts in changed position as compared with Fig. 6;

Fig. 9 is a detailed section taken along line 9—9 of Fig. 8;

Figure 10:
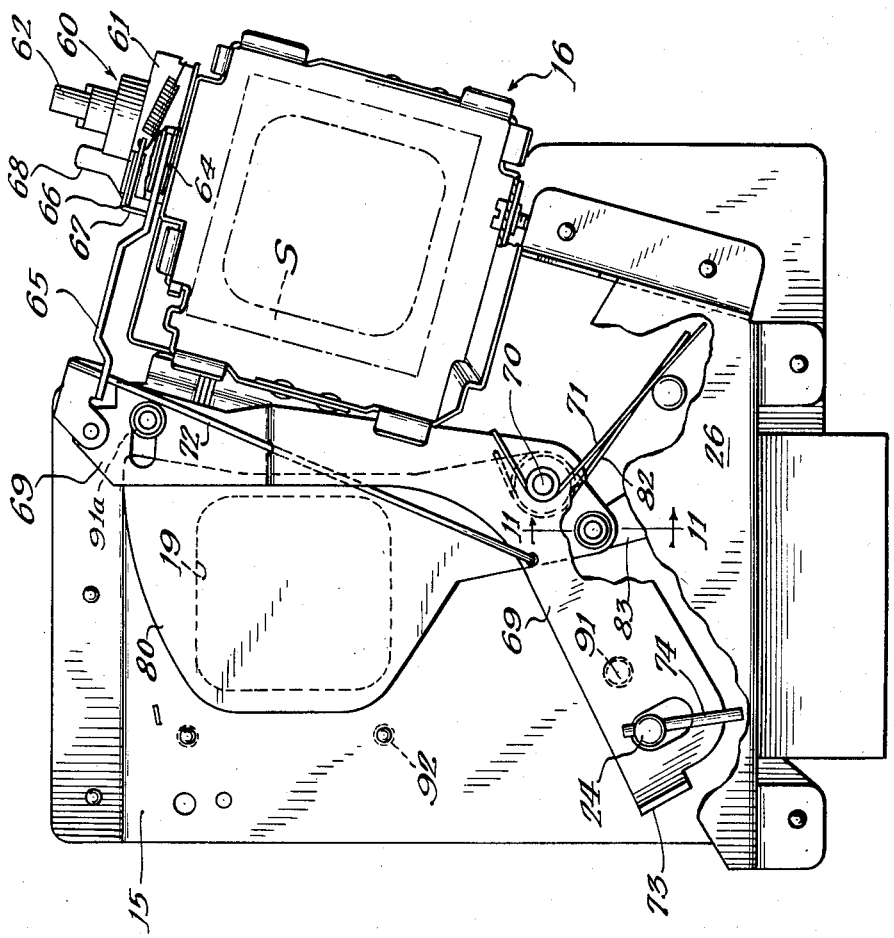
Fig. 10 is a front elevation of the mechanism assembly shown in Fig. 1.

With reference now to Figs. 1, 4 and 6, the structure of the mechanism assembly includes a vertical plate 15, a tunnel assembly 16, and a horizontal plate 17, all of which are suitably secured together to provide a rigid structure. The tunnel assembly 16 provides magazine locating means in which a suitable magazine, not shown, may be received for sliding movement in a longitudinal direction, that is, parallel to the optical axis of the projector.

A lamp housing 18 is mounted on the horizontal plate 17. The vertical plate 15 is provided with a generally rectangular opening 19 which is in front of the lamp housing 18 and which serves as an outlet for the light beam.

A lamp socket 20 is mounted on a suitable bracket 21 which depends from the horizontal plate 17. The rear end of the lamp housing 18 is provided with a reflector 22.

The rear end of the horizontal plate 17 is turned down to provide a bracket 23. A shaft 24 is suitably journaled in bracket 23 and vertical plate 15, this shaft being referred to as the rock shaft since it may be actuated by suitable means, such as a manual operating lever 25, to operate the mechanism.

Also forming a part of the structure is a front plate 26 which cooperates with the vertical plate 15 which supports certain shafts or posts to be hereinafter described.

*Slide transporting mechanism*

The slide transporting mechanism comprises an injector arm 30 having an arcuate arm portion 31, and an ejector arm 32 which carries at its outer end a disk 33. The opposing edges of elements 31 and 33 are slightly concave so as to provide satisfactory engagement with the opposite side edges of a slide.

A post 34 is mounted in plates 15 and 26 and projects beyond the rear surface of the plate 15. The injector arm 30 is rotatably mounted on post 34 by means of a bushing 35 to which the injector arm is secured.

The ejector arm 32 is mounted on a shaft 36 which is journaled in plates 15 and 26. A follower arm 37 is rotatably mounted on the shaft 36 by means of a hub 38. As shown in Fig. 3, the follower arm 37 carries at its outer end a pivot 39, in the form of a shoulder rivet, which extends rearwardly through an enlarged aperture 41 in the ejector arm 32, thus providing a limited amount of lost motion between the elements 32 and 37. A follower wheel 40 is carried on the outer end of the pivot 39.

A retainer lug 42 is suitably riveted to the ejector arm 32 and projects forwardly through an enlarged aperture 43 in the follower arm 37. A coil spring 44, having one end anchored to the follower arm 37, bears against the retainer lug 42, thus urging the ejector arm 32 in the clockwise direction as viewed in Fig. 2. When viewed from the rear as shown in Fig. 8, the action is such that the ejector arm 32 is urged into a left limiting position with respect to the cam follower 40, with the result that it will give to the right. The position of the cam follower 40 is determined by a cam plate 45 in which is formed a cam slot 46 which embraces the cam follower 40. Thus, rotation of the cam plate will cause the ejector arm to be rotated in the same direction.

The injector arm 30 is driven from the follower arm 37 by means of a link 51 which connects with a tail 50 on the injector arm. The left end of the link is provided with a slot 52 through which extends a pin 53 mounted on the tail 50, thus permitting a limited amount of lost motion. As shown in Figs. 6 and 7, a spring 54, having one end connected to the pin 53, and the other end connected to a portion of the link 51, urges the injector arm 30 in the clockwise direction to the limit of the lost motion permitted by the slot 52. In other words, as viewed in Fig. 8, the injector arm has a limited amount of give toward the left, just as the ejector arm 32 has a certain amount of give to the right.

The cam plate 45 is suitably secured to the shaft 24 by means of a pin 55, shown in Fig. 5, the pin being disposed in a slot 56 formed in the cam plate 45. The parts are held in alignment by suitable retaining plates 57 and spring washers 58. Similar construction is provided to secure the manual operating lever 25 to the rear end of the rock shaft 24.

Thus, as the lever 25 is rotated from its upright position, as shown in Fig. 6, to the right, as shown in Fig. 8, the injector and ejector arms 30 and 32 will be rotated accordingly to displace a slide from the magazine position into the projecting position, in the manner pointed out in the aforesaid copending application.

*The magazine advancing mechanism*

The tunnel assembly 16 includes an index pinion assembly 60 which is rotatably mounted on a bracket 61 secured to the top of the tunnel assembly. The index pinion assembly includes a shaft 62, an index pinion 63, and a ratchet wheel 64. A suitable actuating knob may be affixed to the upper end of the shaft 62 to rotate the assembly and advance a magazine (not shown) within the tunnel assembly 60, so as to bring successive slides into alignment with the injector and ejector arms 30 and 32. The magazine is provided with a suitable rack which is engaged by the index pinion 63 in the manner illustrated in the aforesaid copending application. A suitable detent (not shown) may be provided to locate the magazine properly.

Automatic advance of the magazine is provided by means of a pawl 65, shown in Fig. 1, which cooperates with the ratchet wheel 64. Means, hereinafter described, are provided to actuate the pawl from the rock shaft 24. This automatic means may be rendered inoperative by means of a slidably mounted plate 66 having a bent-over lug 67 which engages the pawl 65 to retract the same out of engagement with the ratchet wheel 64. A control lug 68 projects upwardly from the plate 66 and through the housing of the projector so that the position of the plate 66 may be shifted at will.

The pawl 65 is loosely mounted at the upper end of a rock lever 69 which is pivotally mounted on a post 70 which extends between the vertical plate 15 and the front plate 26. A coil spring 71 biases the rock lever 69 to the left into its unoperated position, as shown in Fig. 10. A length of spring wire 72 is anchored at its lower end in the rock lever 69 and at its upper end bears against the pawl 65 to urge the same into engagement with the ratchet wheel 64, or the lug 67, as the case may be.

The lower end of the rock lever 69 is provided with a forwardly extending lug 73 which is engaged by a pin 74 carried on the rock shaft 24. Thus when the rock shaft is rotated to the end of its stroke in the counterclockwise direction, as viewed in Fig. 6, or in the clockwise direction as viewed in Fig. 10, the rock lever 69 will be engaged and rotated so that the upper end moves toward the tunnel assembly, thus moving the pawl 65 into its operated position.

*Shutter operating mechanism*

Figure 11:
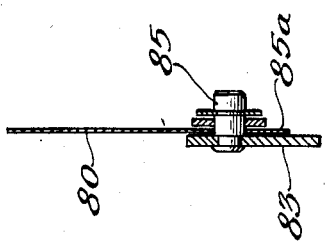
Fig. 11 is a detailed view taken along line 11—11 of Fig. 10 showing the shutter mounting.

As shown in Figs. 10, 1 and 2, a shutter 80 having a hub 81, is pivotally mounted on post 70 directly in front of the aperture 19 in vertical plate 15. A coil spring 82 biases the shutter into its open position. An actuating lever 83 is pivotally mounted on a post 84 which projects rearwardly from the vertical plate 15. The actuating lever 83 is bent, and passes through a suitable opening in the vertical plate 15 so that the upper end of the lever is disposed forwardly of the plate 15, and the lower end is disposed rearwardly of the same. A pin 85 is carried at the upper end of the lever 83 and engages the shutter 80 as shown in Fig. 11, the shutter being provided with a slot 85a to accommodate a sliding motion, the pin passing through this opening.

A follower 86 in the form of a roller is carried at the lower end of the actuating lever 83, as shown in Figs. 6 and 8. The follower cooperates with a cam surface 87 formed on the edge of the cam plate 45. The cam surface is divided into three portions, a high dwell portion 88, a rise portion 89, and a low dwell portion 90. A suitable rubber covered stop pin 91 for the shutter 80 may be provided to limit the open position of the shutter and to absorb the shock of impact which would otherwise be taken up entirely by the low dwell portion 90.

When a slide is in its projecting position, that is, aligned with the aperture 19, the manual lever 25 is in its horizontal position as shown in Fig. 8, and the spring 82 biases the shutter into its open position, against the stop pin 91. At this time, the follower 86 rides on the low dwell portion 90. As the lever 25 is rotated upwardly, the follower 86 and actuating lever 83 are displaced by the rise portion 89 to close the shutter, the closed position being shown in Fig. 10.

*Operation*

The cam groove 46 in the cam plate 45 is provided with a high dwell portion 47, a rise portion 48 and a low dwell portion 49. The high dwell portion 47 accommodates the motion of the rock shaft 24 during the operation of the shutter mechanism. The low dwell portion 49 accommodates the motion of the rock shaft 24 during the operation of the magazine advancing mechanism. Thus, by providing these dwell portions, it is possible to actuate all of the operating mechanisms from the common rock shaft 24.

To summarize the operation, when the slide is in its magazine position, as shown in Fig. 6, the manual lever 25 is in the vertical position. At this time, the follower 40 cooperates with the high dwell portion 47, the pin 74 engages the rock lever 69 to maintain the pawl 65 in its operated position, and the shutter follower 86 cooperates with the high dwell portion 88, which means that the shutter is displaced against the bias of the spring 82 into its closed Fig. 10 position. Movement of the manual lever 85 downwardly toward the right (as viewed from the rear) causes the pawl to return to its unoperated position while the follower 40 is still riding on the high dwell portion 47. After the pawl 65 has returned to its normal unoperated position, then the follower 40 and follower arm 37 are displaced by the rise portion 48 to displace a slide into projecting position, immediately behind aperture 19. During this movement of the slide, the shutter 80 is still closed. At the conclusion of the slide displacing operation, further movement of the manual lever 25 into the Fig. 8 position causes the shutter follower 66 to drop down the rise portion 89 and on to the low portion 90, thus opening the shutter.

Upon return of the manual lever from the Fig. 8 to the Fig. 6 position, the operation of the parts is reversed.

Thus, in order to project a slide, the manual lever 25 is rotated downwardly; at the conclusion of the desired period of projection, the manual lever 25 is rotated upwardly to its initial position, the forward and return motion comprising a complete cycle of operation. At the conclusion of the cycle of operation, the magazine is advanced one position to bring a new slide into alignment with the injector arm 30.

It is possible to render the magazine advancing mechanism inoperative by shifting the control lug 68 forwardly. Then the operator can move the magazine either forwardly or backwardly by rotating a suitable slide selector knob mounted on the shaft 62 in order to select any desired slide in the magazine for projection.

Suitable means are provided to guide the slide in its movement between the initial slide position, in the magazine, and the projecting position, and to maintain the slide in a projecting position. Such means include a guide strip 93, a portion of which is shown in Fig. 1, and resiliently mounted guide wheels, not shown, which are disposed between a guide plate 94, shown in Fig. 8, and the vertical plate 15, the nature and operation of these elements being more fully described in the aforesaid copending application. The arcuate edge 95 of the guide plate 94 is engaged by a suitable flanged disk, not shown, on the ejector arm 32 to maintain the same in the proper plane for engagement with the edge of the slide. A shoulder 96 at the left hand edge of the edge 95 as shown in Fig. 8, serves as a stop to limit the throw of the ejector arm 32. A stop pin 92, also shown in Fig. 8, determines the limiting position of the slide in its projecting position.

The overthrow spring 54, together with pin and slot arrangement 55—56 permit the slide to be held firmly in its projecting position by the injector arm 30, since they permit a certain amount of "give" of the injector arm with respect to the follower arm 37. In other words, the follower arm can overthrow beyond the limiting position of the ejector arm and the slide, as determined by the stop pin 92. This overthrow also accommodates variations in slide dimensions, and manufacturing tolerances in the mechanism, particularly with respect to the angular relationship of the cam plate 45 with respect to the various centers.

Similarly, the overthrow spring 44 permits overthrow of the follower arm 37 and the cam plate 45 with respect to the limiting position of the ejector arm 32 as determined by the shoulder 96.

By virtue of this dual overthrow construction a relatively simple type of actuating means may be utilized, and furthermore the same actuating means may be utilized for the shutter operating mechanism and the magazine advancing mechanism since the usual manufacturing tolerances, which might otherwise interfere with the proper timing of the parts, are readily accommodated.

The disclosure of the aforesaid copending application, Serial No. 495,474, of which this application is a continuation-in-part, is hereby incorporated by reference, insofar as it is consistent with the present invention.

Although only a preferred embodiment of this invention has been shown and described herein, it is understood that various modifications and changes may be made in the construction shown without departing from the spirit of the invention as pointed out in the appended claims.

We claim:

1. In a slide projector, the combination of magazine locating means defining an initial slide position, means including a stop member defining a projecting position, a structural member, an injector arm pivotally mounted on said structural member and having an arcuate shaped arm portion adapted to be extended into said magazine locating means to displace a slide from said initial slide position into said projecting position when said injector arm is rotated, a rock shaft spaced from the pivot of said injector arm, a slot cam mounted on said rock shaft, follower means cooperating with the slot of said slot cam, a link connecting said follower means and said rock shaft, said link being provided with a slot at one end, and said injector arm having a pin extending through said slot to permit a limited amount of lost motion between said link and said injector arm, and spring means extending between said pin and a portion of said link to urge said injector arm in a direction toward said link and toward said projecting position, whereby oscillation of said rock shaft will cause displacement of a slide into engagement with said stop pin, and whereby said spring means and said pin and slot connection will permit overthrow of said rock shaft beyond the limiting position of said injector arm as determined by said slide and said stop member.

2. In a slide projector including a rotatable injector arm and a rotatable ejector arm, and separate pivot means for mounting the same, the combination of a pivoted follower arm, separate overthrow means connecting said follower arm to said injector arm and said ejector arm, each overthrow means including means providing a lost motion connection and an overthrow spring, said overthrow means acting in opposite directions with respect to each other, an oscillating cam for driving said follower arm, and means limiting the motion of said injector arm in a direction toward said ejector arm, and limiting the motion of said ejector arm in a direction toward said injector arm whereby the motion of said cam beyond positions corresponding to the limiting positions of said injector and ejector arms may be accommodated.

3. A slide projector as claimed in claim 2 in which said cam is provided with a rise portion for actuating said follower arm, and a high dwell portion and a low dwell portion each adjacent said rise portion to accommodate motion of said cam beyond the limits of said overthrow means.

4. A slide projector as claimed in claim 3 including magazine advancing means, shutter operating means, means operative upon rotation of said cam when said follower arm engages said high dwell portion for actuating said magazine advancing mechanism, and means operative upon rotation of said cam when said follower arm engages said low dwell portion for operating said shutter operating mechanism.

References Cited in the file of this patent

UNITED STATES PATENTS

| | | |
|---|---|---|
| 522,921 | Spooner | July 10, 1894 |
| 775,963 | Bentzon | Nov. 29, 1904 |
| 998,305 | Roebuck | July 18, 1911 |
| 1,365,752 | Vischer | Jan. 18, 1921 |
| 1,402,791 | Petherick | Jan. 10, 1922 |
| 1,558,272 | Pedersen | Oct. 20, 1925 |
| 2,293,408 | Schwanhausser | Aug. 18, 1942 |
| 2,401,506 | Pechkranz | June 4, 1946 |
| 2,579,281 | Tuck | Dec. 18, 1951 |
| 2,590,492 | Bennett et al. | Mar. 25, 1952 |

FOREIGN PATENTS

| | | |
|---|---|---|
| 509,887 | Great Britain | July 19, 1939 |
| 1,061,808 | France | Dec. 2, 1953 |